Patented Dec. 13, 1938

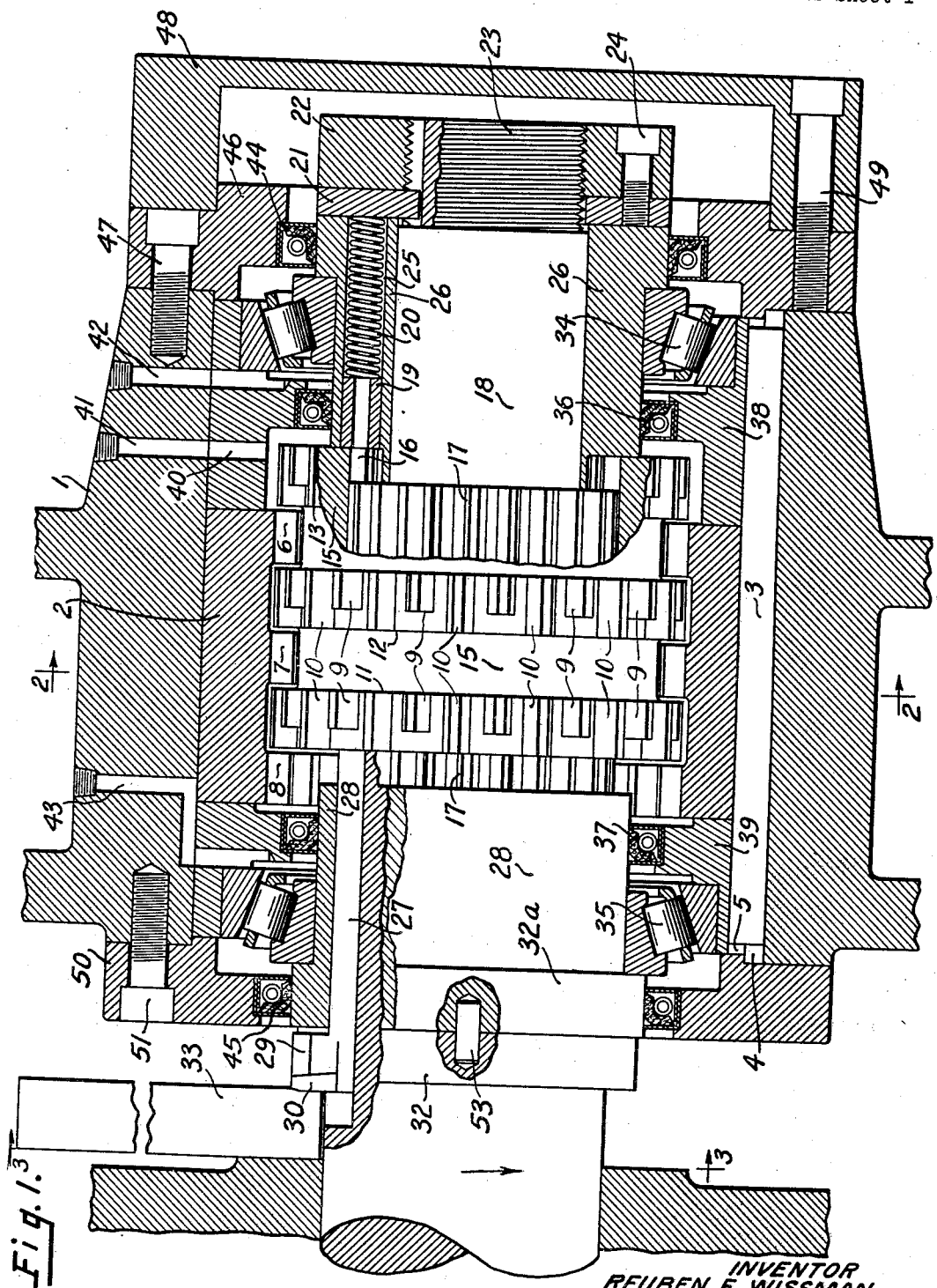

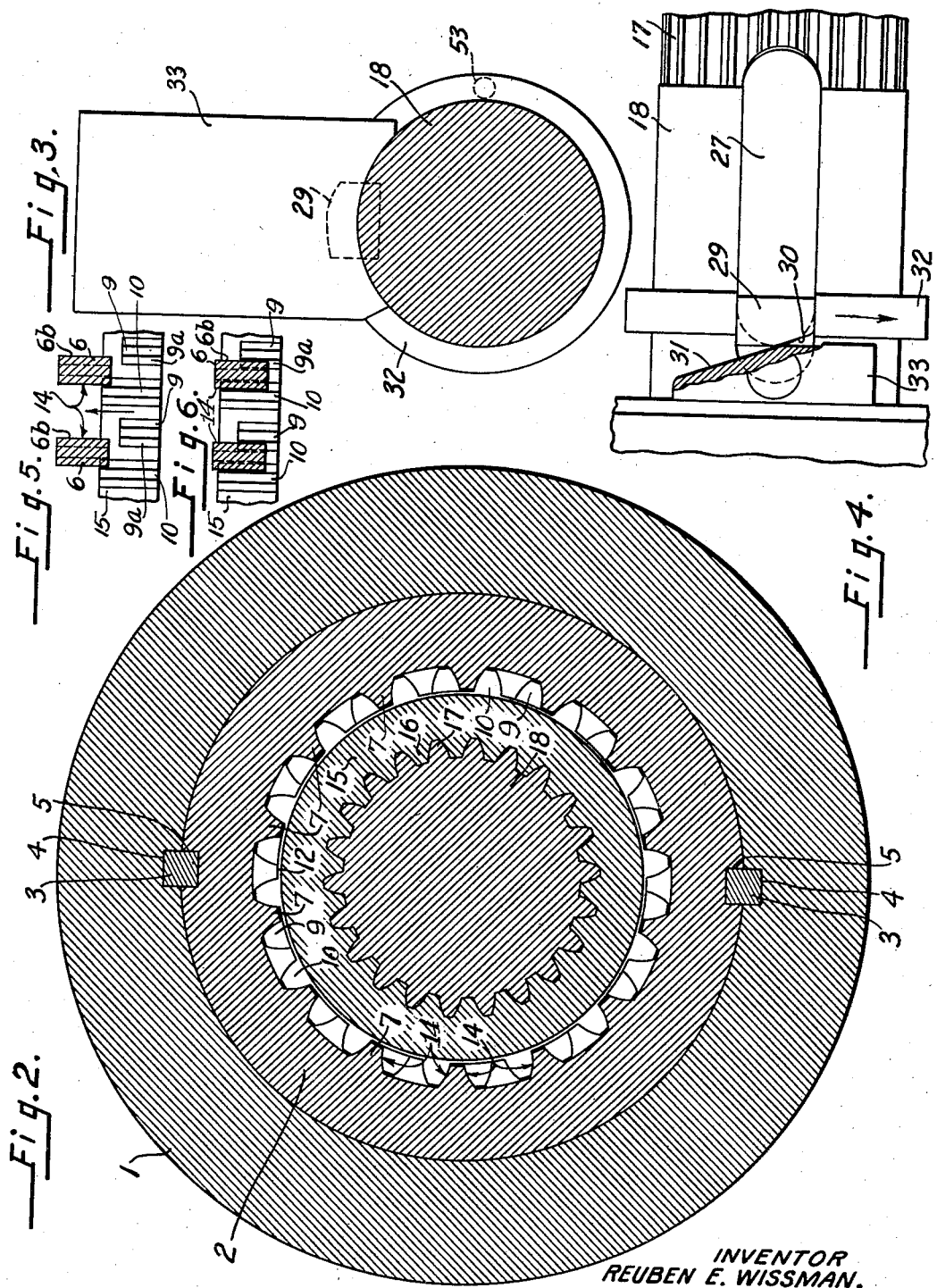

2,140,216

UNITED STATES PATENT OFFICE 2,140,216

OIL CUSHION SPLINED CLUTCH

Reuben E. Wissman, Minster, Ohio, assignor to The Minster Machine Company, Minster, Ohio, a corporation of Ohio Application March 3, 1936, Serial No. 66,889

18 Claims. (Cl. 192—24)

This invention relates to an oil cushion splined clutch.

It is the object of my invention to provide a clutch in which the moving parts are immersed in oil and when full engagement of the clutch members is made, the clutch is locked.

The further object of my invention is to provide a clutch that is especially adaptable to presses, so that when used with dies having spring pressure or air pressure, lost motion is eliminated. With clutches now used on presses, when the press is on the upstroke, the lost motion of the press causes loud noises and serious damage to the unit. The clutch of my invention is so locked that the lost motion is practically eliminated and the clutch remains in engagement without any back lash and can not be disengaged by back pressure.

It is a further object to provide a clutch so arranged that the long teeth first engage in direction of movement and this engagement guides the teeth between the short and long teeth for final clutch engagement.

It is a further object to provide a clutch in which the teeth are always in engagement between at least one of the driving and driven members.

It is a further object to provide a large number of teeth, which permits of quick pick-up between the driving and driven members without any appreciable time lag, thereby making the press much faster in production.

It is a further object to provide a clutch in which the large number of teeth provide a large bearing surface.

It is an additional object of the invention to provide a clutch in which the parts are always moving in the presence of high-pressure oil, which is separated from the bearing compartments supporting the shaft mechanism of the clutch. This results in the bearings being kept free from the chips or portions of metal resulting from the wear of the clutch, and it makes it possible to use in the bearings the particular type of oil especially adapted to bearings, which is not necessarily the kind of oil that has to be used in the clutch. The clutch always works in oil.

It is my object to provide a noiseless clutch completely working in oil and capable of being supported in its elements in bearings that can work in their own type of oil and will be entirely free from contamination by any foreign material resulting from the engagement of the clutch parts.

It is my special object to provide a clutch in which the clutching and declutching can be effected rapidly and with reduced noise by using a method of clutching in which the entering clutch member has a long tooth first engaging with the driving clutch member tooth, due to the pressure of the driving clutch member tooth against the face of the long tooth, and after that engagement is made the intermeshing continues, so that the driving clutch tooth easily enters between the long tooth and a tooth of the entering clutch member.

It is a further object to provide means for automatically declutching, and a simple means of clutching the driving and driven parts.

Referring to the drawings:

Figure 1 is a vertical section through the clutch, partially broken away and showing the clutch in declutched position.

Figure 2 is a section on the line 2—2 of Figure 1, looking in the direction of the arrows.

Figure 3 is a section on the line 3—3 of Figure 1, looking in the direction of the arrows.

Figure 4 is a plan view of the shifting mechanism shown in Figure 3, partially broken away to show the cam action.

Figure 5 is a diagrammatic plan view of the reciprocating driven clutch member entering the driving clutch member with the long tooth in engagement with the tooth of the driving clutch member.

Figure 6 is a similar view with the long and short tooth both engaging a tooth of the driving clutch member.

Referring to the drawings in detail, I designates the hub of a flywheel or other driving mechanism, which is driven by any suitable source of power, not shown. This hub I carries interiorly an internally toothed ring driving clutch member 2, to which it is connected by the keys 3 and keyways 4 and 5 (Figure 2). The internally toothed driving clutch member has three sets of teeth 6, 7 and 8, arranged in spaced parallel rows. This driving clutch member 2 is adapted to have these sets of teeth intermesh with corresponding sets of alternately short and long teeth 9 and 10 which are disposed on the surface of a reciprocating driven clutch member 15 rotating with the driven shaft 18 upon which it is axially slidable, acting in the nature of a spline. In the position shown in Figure 1, these clutch members are in de-clutched position. When the clutch member 15 moves from the righthand position, where it is de-clutched (Figure 1), into the lefthand position, as the driving clutch teeth are moving constantly in a given direction, the long teeth 10 of the driven clutch member 15 enter into the spaces 14 between the teeth 6, 7 or 8. Due to the fact that a tooth 6, for instance, (Figure 5) is moving against the surface of a tooth 10, and that the space 14 between adjacent teeth 6 is large enough to comfortably bring about this preliminary clutching engagement, the short tooth 9 of the driven clutch member 15 working in high pressure oil is easily moved along the surface of the clutch tooth 6 which is pressed against it, to achieve complete clutching engagement between the driving clutch member 2 and the driven clutch member 15. As the two clutch members are rotating together, the teeth 9 and 10 of the driven clutch member 15 are moving from the position shown in Figure 5 into the position shown in Figure 6. The short tooth 9 will then be brought with its face 9a into engagement with the abutting face 6b of the clutch tooth 6, so that both teeth 9 and 10 will be disposed in the space 14 between adjacent teeth 6, when the clutching engagement of the driving clutch member 2 and the driven clutch member 15 is completed. The intermeshing of these teeth will be accomplished without injury to the respective teeth, without noise, and with great rapidity, as it is much easier to insert the tooth 10 into the large space 14 than it would be to endeavor to insert two teeth of the same length as 10 into the space 14. This progressive meshing is an important factor in the success of my oil cushion splined clutch.

The other sets of teeth 7 and 8 likewise engage with their sets of long and short teeth of the sets 12 and 11 respectively, so that there is a very large number of teeth with large bearing surfaces employed for a given diameter of clutch. This driven clutch member or sleeve, generally designated 15, is constructed in the form of a sleeve provided with internal teeth 16 which are in constant engagement with the external teeth 17 on the driven shaft 18.

The driven clutch member or sleeve 15 is engaged by a plurality of plungers 19 which are pressed against one end thereof by the springs 20, the outer ends of which engage the ring plate 21 which is held in position by the nut 22 on the threaded end 23 of the driven shaft 18. This ring plate 21 is retained in position by the screw bolt 24 passing through the nut 22 and into the ring plate 21, which is keyed to the driven shaft 18. The threaded engagement of the nut 22 with the driven shaft 18 definitely locates the nut 22 axially with respect to the driven shaft 18. The attachment of the nut 22 by means of bolt 24 to the ring plate 21, which is keyed on the driven shaft 18, prevents relative rotary movement between the nut 22 and the driven shaft 18. Thus, by means of bolt 24, the ring plate 21 and the nut 22 are rigidly secured together on the driven shaft 18 against either axial or rotary movement.

The springs 20 work in cylindrical passageways 25 which are disposed axially in the bearing sleeve 26. These springs 20 tend to constantly urge the driven clutch member or sleeve 15 so as to mesh the long teeth 10 and the short teeth 9 with the teeth of the driving clutch member 2. This pressure is resisted by the engagement of the shifting pin 27 with the opposite end of the driven clutch member or sleeve 15.

The shifting pin 27 reciprocates in a slot in the driven shaft 18 with which it rotates and is covered, for a substantial part of its length by the bearing sleeve 28. The shifting pin 27 provided at its outer external end with an exposed head 29 having a cam surface 30 (Figure 4). This cam surface 30 is engaged by a cam face 31 of the stationary cam operating plate 33 so that, by relative movement between the cam surface 30 and the cam face 31 of the stationary cam operating plate 33, axial movement of the shifting pin 27 with respect to the driven shaft 18 is accomplished. The cam operating plate 33 is normally stationary, but it may be moved manually from the position shown in Fig. 1, so as to release shifting pin 27. In other words, in a position shown in Fig. 1, the cam operating plate 33 must be moved out of the way of shifting pin 27 to permit the same to move to the left together with sleeve 15 and teeth 9 and 10 thereon which engage teeth 6, 7 and 8 on driving member 2, under the influence of springs 20 when the cam operating plate 33 is manually operated.

The two bearing sleeves 26 and 28 are supported in roller bearings 34 and 35 on either side of the clutch members. These bearings are separated from the clutch chamber, in which the clutch members operate, by sealing members 36 and 37, which are supported in rings 38 and 39 on either side of the driving clutch member 2 and within the hub 1. The ring 38 is provided with a passageway 40 registering with the passageway 41 in the hub 1, through which high pressure oil is delivered to the clutch chamber where the clutch members operate, so that they always operate in high pressure oil. Said high pressure oil is an oil capable of withstanding high pressures. Such oil is now on the market and is sold by several manufacturers for machines of the type herein described.

The sealing members 36 and 37 prevent the escape of high pressure oil from the clutch chamber along with any entrained dirt or foreign metal parts due to the operation of the clutch, so that the bearings 34 and 35 cannot be contaminated. These bearings 34 and 35 are supplied through passageways 42 and 43 in the hub 1 and the rings 38 and 39 with a lubricant, particularly adapted to roller bearings of this character. The external sealing members 44 and 45 prevent the escape of this lubricant from the roller bearing chambers and also prevent the entrance of foreign material into the roller bearings. The right-hand roller bearing 34 is enclosed by the plate 46 which cooperates with the external sealing member 44. The plate 46 is secured to the end of the hub 1 by machine screws 47. A cover plate 48 is secured to this end plate 46 by means of screw bolts 49. The opposite end of hub 1 carries a cover plate 50 which is provided with an internal annular shoulder adapted to receive the external sealing member 45. This cover plate 50 is secured to the hub 1 by means of screw bolts 51.

An integral annular ring 32 is formed on the left portion of the driven shaft 18. The slot provided in the driven shaft 18 for the shifting pin 27 extends through this ring, as shown in Figure 4. A shoulder 32a formed on the bearing member 28 has the periphery thereof in engagement with the external sealing member 45. This shoulder abuts the annular ring 32 and is secured against rotation with respect thereto by means of pin 53 (Figures 1 and 3). The annular ring 32 cooperates with the above described nut 22 and ring plate 21 to provide for adjustment of bearings 34 and 35 and the associated clutch parts axially with respect to shaft 18 for the purpose of providing proper adjustment of the parts in operation and for compensating for wear thereof.

The ring 38, plate 46, external sealing member 44, sealing member 36 and bearing sleeve 26 cooperate to form a supplementary bearing lubricant chamber for the bearing 34; a like chamber is formed for the bearing 35 by the ring 39, cover plate 50, external sealing ring 45, sealing ring 37 and bearing sleeve 28.

*Operation*

The mechanism is shown in de-clutched position tion in Figure 1. As shown in Figure 1, the cam surface 30 of the shifting pin 27 is in engagement with the flat portion of the cam face 31 of the stationary cam operating plate 33. The driven clutch member 15 is held by the shifting pin 27 in its rightmost position against compressive force of the springs 20. The cam operating plate 33 is operated by any conventional means to cause engagement and disengagement of the clutching teeth 6, 9 and 10. It may be assumed that the flywheel or driving clutch member 1 is either continuously or intermittently rotated. Assuming the parts to be in a position as shown in Figs. 1, 3, 4 and 5, and it is desired to engage the clutching parts, the cam operating plate 33 is moved away from and out of engagement with shifting pin 27. As soon as this takes place, the teeth 6, 7 and 8 become progressively engaged with the teeth 10 and later with the teeth 9, as shown in Fig. 6. The parts will then rotate as shown by the arrows in Figs. 1 and 4. If, after engagement of the clutching teeth, as stated above, the cam plate 33 is again moved to its lowermost position, as shown in Fig. 3, when the shifting pin 27 approaches the cam operating plate, the surfaces 30 and 31, respectively, of these parts become engaged and the surface 30 rides up the surface 31 of the cam operating plate, thereby causing teeth 6 to become disengaged from the teeth 9 and 10 with the parts assuming the position substantially as shown in Fig. 4. The clutch members 2 and 15 remain fully disengaged during the engagement of the cam surface 30 with the first flat portion of the cam face 31. The cam operating plate 33 is, as shown, mounted on a stationary part of the frame.

It is to be understood that member 33 is operated to provide for a single operation of the clutch, as is common with presses of the type set out in paragraph 3, page 1, of this specification.

The sides of the head 29 of the shifting pin 27 are guided by the shoulders formed on the annular ring 32 by the extension of the shifting pin guide slot through the annular ring 32. This prevents undue strain on the body portion of the shifting pin 27 which is relatively thinner than is the head portion 29. Likewise, binding of the parts is prevented.

With reference particularly to Figure 1, it will be seen that the bearings 34 and 35 are supported respectively on bearing sleeves 26 and 28. These bearing sleeves are adjustable toward one another in order to adjust the moving parts of the clutch mechanism by means of the relative axial adjustment of the annular ring 32 and the nut 22. This is accomplished by removing the screw 24 from the ring plate 21 by adjusting the nut 22 axially of the driven shaft 18 by means of threads 23 and thence, by means of the screw 24, securing the nut 22 to the ring plate 21 which is prevented from rotative movement by its splined engagement with the driven shaft 18.

By connection of the passageway 41 to a suitable supply of high pressure oil, the clutch chamber is lubricated. The passageways 42 and 43 are provided with lubricant suitable for roller bearings, such as 34 and 35. By this means the bearings may be provided with suitable lubricant, while lubricant of an entirely different character and suitable for thorough lubrication of the clutching members is provided in the clutch member.

It will be understood that I desire to comprehend within my invention such modifications as may be necessary to adapt it to varying conditions and uses.

Having thus fully described my invention, what I claim as new and desire to secure by Letters Patent, is:

1. In clutching mechanism including a driving clutch member having a plurality of axially spaced series of interior teeth, a clutch sleeve having a corresponding plurality of axially spaced series of external teeth lesser in length than the space between the spaced series of teeth on the interior of the driving clutch member and having internal teeth; a driven shaft having a plurality of external teeth engaging with the plurality of internal teeth on the interior of said clutch sleeve, and the internal teeth on the interior of said driving clutch member being lesser in length than the teeth on said shaft, but greater in length than certain of said series of the teeth on the exterior of the clutch sleeve, whereby the clutch sleeve reciprocates on said driven shaft in constant driving engagement and its external teeth alternately engage and disengage the internal teeth of the driving clutch member.

2. In combination in a one revolution clutch mechanism, a driving clutch member having a plurality of internal teeth and a driven clutch member having a corresponding plurality of interengaging teeth, said driven clutch member including a slidable sleeve upon which said last named teeth are mounted so arranged that two teeth of the driven clutch member are adapted to be inserted between a pair of teeth on the driving clutch member, yieldable means effective to cause engagement of said clutch members, and means to disengage said clutch members at approximately the end of a revolution.

3. In combination in a one revolution clutch mechanism, a driving clutch member having a plurality of teeth and a driven clutch member having a plurality of interengaging teeth, said driven clutch member including a slidable sleeve upon which said last named teeth are mounted so arranged that two teeth of the driven clutch member are adapted to be inserted between a pair of teeth on the driving clutch member, one of said teeth on the driven clutch member being substantially of the same length as the teeth of the driving clutch member, and the other tooth on the driven clutch member being lesser in length, whereby a pair of teeth of the driven clutch member, comprising a long and short tooth, are inserted between two teeth of the same length on the driving clutch member, yieldable means effective to cause engagement of said clutch members, and means to disengage said clutch members at approximately the end of a revolution.

4. In combination, a driving clutch member having a plurality of spaced series of internally-disposed teeth, a reciprocable clutch sleeve having a plurality of corresponding series of teeth spaced from one another and adapted to be locked by the series of teeth in the interior of the driving clutch member on being meshed therewith, the teeth of the clutch sleeve in each series being twice the number of the teeth in the corresponding series in the driving clutch member, and the teeth on the clutch member being arranged in pairs, so that one tooth is longer than the other tooth, each pair being adapted to be inserted between a corresponding pair of teeth on the driving clutch member, means yieldingly to cause said clutch member and said clutch sleeve to engage at the beginning of a revolution, and means to disengage said clutch member and said clutch sleeve at the end of a revolution.

5. In one revolution clutching mechanism including a driving clutch member and a clutch sleeve having a plurality of teeth arranged in pairs, one tooth longer than the other, each pair being adapted to be inserted between a corresponding pair of teeth on the driving clutch member; teeth on the interior of said clutch sleeve constantly in engagement with a plurality of teeth on the exterior of a driven shaft, and a driven shaft adapted to reciprocably support said clutch sleeve thereon, so as to turn therewith, and means including a shifting pin slidably supported by the driven shaft for axial movement with respect thereto for shifting said clutch sleeve so that its long teeth will first enter between the driving clutch member teeth and thereafter the short teeth will enter between pairs of the driving clutch member teeth clutch member, yieldable means effective to cause engagement of said clutch members, and means to disengage said clutch members at approximately the end of a revolution.

6. In combination in one revolution clutch mechanism, a driving clutch member having a plurality of spaced internally-disposed series of teeth, a reciprocating clutch sleeve having corresponding spaced series of externally-disposed teeth, the teeth of which are arranged in pairs, with one tooth longer than the other in each pair, said driving clutch member having the teeth of each series so spaced as to accommodate therebetween a pair of teeth on the corresponding series of external teeth on the clutch sleeve; internally-disposed teeth extending throughout the length of the clutch sleeve, a driven shaft having external teeth adapted to constantly engage therewith, and means for shifting said clutch sleeve on said shaft reciprocably for alternately engaging and disengaging with the teeth clutch member, yieldable means effective to cause engagement of said clutch members, and means to disengage said clutch members at approximately the end of a revolution.

7. In combination, a driving clutch member having spaced internally-disposed series of teeth, a reciprocating clutch sleeve having corresponding spaced series of externally-disposed teeth, the teeth of which are arranged in pairs, so that one tooth is longer than the other in each pair, said driving clutch member teeth of each series being so spaced as to accommodate therebetween a pair of teeth on the corresponding series of external teeth on the clutch sleeve; internally-disposed teeth extending throughout the length of the clutch sleeve, a driven shaft having external teeth adapted to constantly engage therewith, and means for shifting said clutch sleeve on said shaft reciprocably for alternately engaging and disengaging its teeth with the driving clutch member teeth, said shifting means comprising yielding means engaging with said clutch sleeve adapted to constantly move it in one direction to engage the external teeth on the clutch sleeve with the internal teeth of the driving clutch member, and means engaging the other end of said clutch sleeve to overcome the pressure of said yielding means to maintain the clutch sleeve in its declutched position.

8. In combination, a driving clutch member having spaced internally-disposed series of teeth, a reciprocating clutch sleeve having corresponding spaced series of externally-disposed teeth, the teeth of which are arranged in pairs, so that one tooth is longer than the other in each pair, said driving clutch member teeth of each series being so spaced as to accommodate therebetween a pair of teeth on the corresponding series of external teeth on the clutch sleeve; internally-disposed teeth extending throughout the length of the clutch sleeve, a driven shaft having external teeth adapted to constantly engage therewith, and means for shifting said clutch sleeve on said shaft reciprocably for alternately engaging and disengaging its teeth with the driving clutch member teeth, said shifting means comprising yielding means engaging with said clutch sleeve adapted to constantly move it in one direction to engage the external teeth on the clutch sleeve with the internal teeth of the driving clutch member, and means engaging the other end of said clutch sleeve to overcome the pressure of said yielding means to maintain the clutch sleeve in its declutched position, said last-mentioned means comprising a reciprocable pin, and cam means for reciprocating said pin to reciprocate said clutch sleeve.

9. In a clutch, a driving clutch member having internal teeth, a reciprocating clutch sleeve having interengaging external teeth, a driven shaft having external teeth constantly engaging with internal teeth within said sleeve, means to enclose said members to form therearound a pool of lubricant in which said members constantly operate, bearing means exterior of said enclosure adapted to support said driven shaft, and means for forming lubricant chambers around said shaft for said bearing members at opposite sides of said enclosure.

10. In combination, a driven shaft, clutch members associated therewith, means enclosing said members around said shaft to form a lubricant pool, bearing members outside of said enclosure for supporting said shaft, and means to seal said lubricant pool chamber for the clutch members from said bearing members, and means to form bearing lubricating chambers around said bearing members adjacent said shaft.

11. In combination, a driven shaft, clutch members associated therewith, means enclosing said members around said shaft to form a lubricant pool, bearing members outside of said enclosure for supporting said shaft, and means to seal said lubricant pool chamber for the clutch members from said bearing members, and means to form supplementary bearing chambers around said bearing members adjacent said shaft, and means for supplying the clutch member chamber and the bearing chambers with lubricant through independent passageways.

12. In combination, an internal driving clutch member having spaced series of teeth, a clutch sleeve mounted therein having corresponding spaced series of teeth double in number to the teeth of the driving clutch member and so arranged that a pair of teeth in each series of the clutch sleeve will enter between a pair of teeth in each series of the driving clutch member, internal teeth on the interior of said clutch sleeve in constant engagement with external teeth on a driven shaft, and a driven shaft having external teeth, bearing sleeves on said shaft on opposite sides of said external teeth, yielding means in one of said bearing sleeves for constantly pressing said clutch sleeve and its teeth into engagement with the driving clutch member teeth, and means carried by the other bearing sleeve for moving said clutch sleeve into disengaged position.

13. In combination, an internal driving clutch member having spaced series of teeth, a clutch sleeve mounted therein having corresponding spaced series of teeth double in number to the teeth of the driving clutch member and so arranged that a pair of teeth in each series of the clutch sleeve will enter between a pair of teeth in each series of the driving clutch member, internal teeth on the interior of said clutch sleeve in constant engagement with external teeth on a driven shaft, and a driven shaft having external teeth, bearing sleeves on said shaft on opposite sides of said teeth, yielding means in one of said bearing sleeves for constantly pressing said clutch sleeve and its teeth into engagement with the driving clutch member teeth, means carried by the other bearing sleeve for moving said clutch sleeve into disengaged position, and roller bearing member engaging the exterior of said bearing sleeves for supporting said shaft at opposite sides of its external teeth.

14. In combination, an internal driving clutch member having spaced series of teeth, a clutch sleeve mounted therein having corresponding spaced series of teeth double in number to the teeth of the driving clutch member and so arranged that a pair of teeth in each series of the clutch sleeve will enter between a pair of teeth in each series of the driving clutch member, internal teeth on the interior of said clutch sleeve in constant engagement with external teeth on a driven shaft, and a driven shaft having external teeth, bearing sleeves on said shaft on opposite sides of said teeth, yielding means in one of said bearing sleeves for constantly pressing said clutch sleeve and its teeth into engagement with the driving clutch member teeth, and means carried by the other bearing sleeve for moving said clutch sleeve into disengaged position, roller bearing members engaging the exterior of said bearing sleeves for supporting said shaft at opposite sides of the external teeth thereof, means to enclose said clutch members to form a pool for high-pressure lubricant and to separate said clutch members from said last-mentioned bearing members to prevent the passage of lubricant from the clutch members to the bearing members.

15. In combination, an internal driving clutch member having spaced series of teeth, a clutch sleeve mounted therein having correspondingly spaced series of teeth double in number to the teeth of the driving clutch member and so arranged that a pair of teeth in each series of the clutch sleeve will enter between a pair of teeth in each series of the driving clutch member, internal teeth on the interior of said clutch sleeve in constant engagement with external teeth on a driven shaft, and a driven shaft having external teeth, bearing sleeves on said shaft on opposite sides of said teeth, yielding means in one of said bearing sleeves for constantly pressing said clutch sleeve and its teeth into engagement with the driving clutch member teeth, and means carried by the other bearing sleeve for moving said clutch sleeve into disengaged position, roller bearing members engaging the exterior of said bearing sleeves for supporting said shaft at opposite sides of its exterior teeth, means to enclose said clutch members to form a pool for high-pressure lubricant and to separate said clutch members from said last-mentioned bearing members to prevent the passage of lubricant from the clutch members to the bearing members, means to form lubricant chambers around said shaft adjacent each one of said bearing members, whereby an independent type of lubricant can be supplied to the bearing members without being supplied to said clutch members.

16. In combination, a driving clutch member having a plurality of teeth and a driven clutch member supported on a driven shaft, telescopically enclosed by said driving clutch member and having a plurality of interengaging teeth, so arranged that two teeth of the driven clutch member are adapted to be inserted between a pair of teeth on the driving clutch member, one of said teeth on the driven clutch member being of substantially the same length as the teeth of the driving clutch member, and the other tooth on the driven clutch member being lesser in length, whereby a pair of teeth of the driven clutch member, comprising a long and short tooth, are inserted between two teeth of the same length on the driving clutch member, and said driven shaft being supported on bearings spaced at either side of said clutch members and means comprising a rotary member and a manually operable member for moving said driven clutch member on said driven shaft, said rotary member being in constant engagement with said driven clutch member.

17. In combination, a driving clutch member having a plurality of teeth and a driven clutch member supported on a driven shaft and having a plurality of interengaging teeth, so arranged that two teeth of the driven clutch member are adapted to be inserted between a pair of teeth on the driving clutch member, one of said teeth on the driven clutch member being of substantially the same length as the teeth of the driving clutch member, and the other tooth on the driven clutch member being lesser in length, whereby a pair of teeth of the driven clutch member, comprising a long and short tooth, are inserted between two teeth of the same length on the driving clutch member, bearings spaced at either side of said clutch members for supporting said driven shaft and means within said bearings for shifting said clutch members into and out of engagement.

18. In combination, a driving clutch member having a plurality of teeth and a driven clutch member supported on a driven shaft and having a plurality of interengaging teeth, so arranged that two teeth of the driven clutch member are adapted to be inserted between a pair of teeth on the driving clutch member, one of said teeth on the driven clutch member being of substantially the same length as the teeth of the driving clutch member, and the other tooth on the driven clutch member being lesser in length, whereby a pair of teeth of the driven clutch member, comprising a long and short tooth, are inserted between two teeth of the same length on the driving clutch member, bearings spaced at either side of said clutch members for supporting said driven shaft, and means within said bearings for shifting said clutch members into and out of engagement at the beginning and end respectively of a cycle of operation.

REUBEN E. WISSMAN.